United States Patent
Lu et al.

(10) Patent No.: US 7,092,808 B2
(45) Date of Patent: Aug. 15, 2006

(54) INTEGRATED SENSING SYSTEM FOR AN AUTOMOTIVE SYSTEM

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 10/739,370

(22) Filed: Dec. 18, 2003

(65) Prior Publication Data

US 2004/0249545 A1 Dec. 9, 2004

Related U.S. Application Data

(60) Provisional application No. 60/450,204, filed on Feb. 26, 2003.

(51) Int. Cl.
*G06F 19/00* (2006.01)

(52) U.S. Cl. .......................... 701/70; 701/45; 701/38; 340/440; 280/5.5; 280/735; 180/271

(58) Field of Classification Search ............... 180/244, 180/197, 124.159, 271, 282, 408; 342/70; 702/151; 701/45, 70, 38, 91; 340/440, 429, 340/436; 280/5.5, 5.502, 5.507, 735
See application file for complete search history.

(56) References Cited

U.S. PATENT DOCUMENTS

| 5,408,411 | A | 4/1995 | Nakamura et al. |
| 6,184,637 | B1 * | 2/2001 | Yamawaki et al. ......... 318/432 |
| 6,324,446 | B1 | 11/2001 | Brown et al. |
| 6,678,631 | B1 * | 1/2004 | Schiffmann ................ 702/151 |
| 2002/0065591 | A1 * | 5/2002 | Schubert et al. ............ 701/38 |
| 2002/0095244 | A1 * | 7/2002 | Rhode et al. .................. 701/1 |
| 2003/0088349 | A1 * | 5/2003 | Schubert et al. ............ 701/36 |

FOREIGN PATENT DOCUMENTS

| EP | 1 002 709 | 5/2000 |
| EP | 1 147 929 | 10/2001 |

* cited by examiner

*Primary Examiner*—Matthew Luu
*Assistant Examiner*—Tuan C To
(74) *Attorney, Agent, or Firm*—Artz & Artz, P.C.; Gary A. Smith

(57) ABSTRACT

An integrated sensing system for an automotive vehicle includes a plurality of sensors sensing the dynamic conditions of the vehicle. The sensors include a sensor cluster, a steering angle sensor, wheel speed sensors, any other sensors required by subsystem controls. The outputs from the sensing system are used to drive various vehicle control systems and to warn the drivers for certain abnormal operating conditions. The vehicle controls coupled with the integrated sensing system controller achieve control objectives including: fuel economy, chassis controls, traction controls, active safety, active ride comfort, active handling, and passive safety.

7 Claims, 3 Drawing Sheets

INTEGRATED SENSING SYSTEM FOR AN AUTOMOTIVE SYSTEM

CROSS-REFERENCE TO RELATED APPLICATIONS

The present invention is related to application 60/450,204 entitled "Integrated Sensing System for an Automated System," filed on Feb. 26, 2003 and incorporated by reference herein.

TECHNICAL FIELD

The present invention relates generally to a vehicle sensing system and, more specifically, to a system for controlling an automotive vehicle in response to sensed dynamic behavior from the sensing system.

BACKGROUND

Various automotive vehicles have recently begun including vehicle control systems. Such vehicle control systems include yaw stability control systems, roll stability control systems, integrated vehicle dynamic control systems, etc. The ongoing goal of vehicle controls is to achieve a coordinated system level vehicle performances for ride, handling, safety and fuel economy.

With current advances in mechatronics, vehicle controls have increased opportunities for achieving performances, which were previously reserved for spacecraft and aircraft. For example, gyro sensors, previously only used in aircraft, have now been incorporated in various vehicle controls, and the anti-lock brake systems invented for airplanes are now standard automotive control systems. Current sensor technology generates ever-increasing opportunities for vehicle control.

A typical vehicle control system utilizes 3-dimensional vehicle motions. For example, during yaw stability and roll stability controls, the control task involves three-dimensional motions along the vehicle roll, pitch, and yaw directions and along the vehicle longitudinal, lateral and vertical directions.

The coupling between different motion directions should not be neglected in most maneuvers involving vehicle roll over or vehicle yaw. For example, excessive steering of a vehicle will lead to excessive yaw and lateral motion, which may cause large rolling motion towards the outside of a turn. If the driver brakes the vehicle during the excessive steering, the vehicle will also experience roll and pitch motions in conjunction with lateral and longitudinal accelerations. Therefore, a successful vehicle dynamics control should involve an accurate determination of the vehicle roll, pitch and yaw attitudes (side slip angle).

Currently, inertial measurement units (IMUs) and various other sensors used in aerospace vehicle controls have been incorporated in automotive vehicles for inertial control. IMUs have been used in inertial navigation systems (INS) for aircrafts and satellites for decades. Typically, an INS system determines the attitude of a flight vehicle through IMU sensor signals.

An IMU sensor set includes three gyros and three linear accelerometers. An INS contains an IMU and a processor unit to compute the navigation solutions necessary for navigation, attitude reference and various other data communication sources.

Although INS systems are sufficient to generate a navigation solution, over time the computation based on IMU sensor signals drifts, and the errors associated with the computation increases. Sometimes these errors increase such that a navigation solution is unattainable within the INS. To mitigate this problem and to compute a correct navigation solution over the entire flight, external navigation sources are used to continually correct the attitude computations based on IMU sensor signals. One of the more reliable of external sources is a GPS system with multiple GPS receivers. Such a system has been used to determine a rough attitude reference of a vehicle in flight.

Current automotive vehicle systems experience a similar signal drift problem in vehicle attitude determination. Although the drift is not as severe as in aerospace vehicles, it generates errors within the vehicle control system such that the vehicle control system engages improper actions.

It would therefore be desirable to provide a vehicle system sensing algorithm that uses sensors to determine the vehicle operation states, to monitor abnormal vehicle operation states, and to compensate the sensor errors for various automotive vehicle control applications.

SUMMARY OF THE INVENTION

In one aspect of the invention, a vehicle control system includes a sensor cluster within a housing generating a roll rate signal, a pitch rate signal, a yaw rate signal, a longitudinal acceleration signal, a lateral acceleration signal, and a vertical acceleration signal. The roll rate signal, the pitch rate signal, the yaw rate signal, the longitudinal acceleration signal, the lateral acceleration signal, and the vertical acceleration signal are received within an integrated controller, which generates various vehicle operation states and the road conditions. The vehicle operation states and road conditions are received in a dynamic system controller, which generates a dynamic control signal in response thereto. The dynamic control signal is received within vehicle actuators including controlled brakes, controlled front and/or rear steering, controlled suspensions, controlled anti-roll-bar, power-train actuators, drive-train actuators. More specifically, this invention shows using the estimated vehicle operation state information for the braking system controller, which generates a braking signal in response thereto.

In a further aspect of the invention, a method for controlling a safety device for a vehicle includes generating a roll rate signal, generating a pitch rate signal, generating a yaw rate signal, generating a longitudinal acceleration signal, generating a lateral acceleration signal, and generating a vertical acceleration signal. In response to the roll rate signal, the pitch rate signal, the yaw rate signal, the longitudinal acceleration signal, the lateral acceleration signal, and the vertical acceleration signal, a vehicle reference velocity signal is generated. In response to the vehicle reference velocity signal, a dynamic control signal is generated, and a vehicle safety device is controlled in response to the safety device control signal.

Thus, the present system may be incorporated in but not limited to a rollover stability control system (RSC), a yaw stability control system, an ABS/TCS control system and a power-train control system for fuel economy purpose. One advantage of the invention is that the sensor cluster in tandem with the integrated controller generates accurate vehicle attitude and velocity signals. More specific example is the vehicle longitudinal velocity. During braking or throttle conditions, the wheel speed signal alone would not be able to generate accurate vehicle reference speed (longitudinal velocity) which is used in wheel slip control for achieving RSC/TCS/ABS functions. When the wheels of one side of the vehicle are up in the air (due to large roll trending of the vehicle), those wheel speed information are no longer the valid indications of the vehicle speed. In off-road driving, more than one wheel could behave independently of the vehicle speed.

Another advantage is the substantially improved accuracy of current vehicle dynamics and predicted vehicle dynamics as used in but not limited to rollover stability control systems, yaw stability control systems, ABS/TCS control systems, power-train control systems.

A further advantage is the substantially improved accuracy of the predicted road conditions on which the vehicle is driven. For example, the accurate identification of the road inclination could help the throttle control system to cut unnecessary fuel consumption during down hill driving; the accurate identification of the road surface friction condition could help RSC and yaw stability control.

Still a further advantage is the ability to identify the vehicle parameter changes. For example, the loading or mass variation of the vehicle could be identified so that appropriate level of control actions could be adjusted in proportional to the vehicle loadings.

Another advantage is the ability to detect the sensor misalignment errors and sensor plausibility check. The sensor misalignment errors has two portions (i) the sensor mounting errors; (ii) the uneven loading conditions generating misalignment between the loading vehicle and the unloading vehicle. Such an identification of the sensor misalignment errors could substantially improve the accuracy of the predicted vehicle operation states.

Another advantage is the ability to substantially improve the performance of the four wheel drive vehicle due to the accurate identification of the force and torque applied to the wheels. Hence both the command drive torque and the resultant torque on the wheel end can be accurately identified so as to increase the efficiency of the torque-on-demand strategy.

Another advantage is the ability to monitor and detect the potential abnormal states of the vehicle including but not limited to tire under-inflation, tire imbalance, suspension wear.

Other objects and features of the present invention will become apparent when viewed in light of the detailed description of the preferred embodiment and when taken in conjunction with the attached drawings and appended claims.

DESCRIPTION OF THE PREFERRED EMBODIMENT

Figure 1:
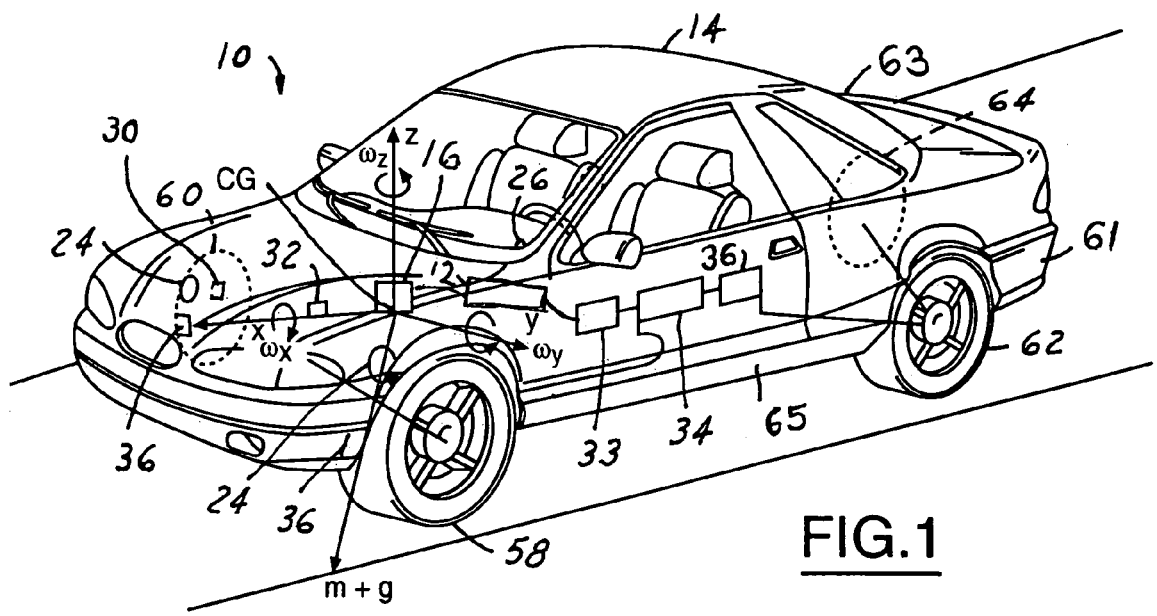
FIG. 1 is a diagrammatic view of a vehicle system in accordance with one embodiment of the present invention.

In the following figures the same reference numerals will be used to identify the same components. The present invention is preferably used in conjunction with vehicle control systems, which include, but are not limited to a yaw stability control system, a roll stability control system, an integrated vehicle dynamics control system, or a total vehicle control system for achieving fuel economy and safety and other vehicle level performances.

The integrated system controller or integrated sensing system controller (ISS) in the present invention estimates and predicts the vehicle operation states including vehicle global and relative attitudes, vehicle directional velocities, forces and torques applied to a vehicle, etc.; generates a sensor plausibility check; monitors the abnormal conditions of the moving vehicle; and corrects the sensor mounting errors of the sensors. The information generated from the integrated system controller is used to initiate control commands for various control systems including, but not limited to: power-train controls, brake controls, steering controls, transmission controls, suspension controls, etc. Additional controls include warnings to drivers of possible abnormal conditions such as: tire under inflation and unbalanced tires, on-line conditioning, and calibration of the errors in sensors due to mounting errors.

Figure 3:
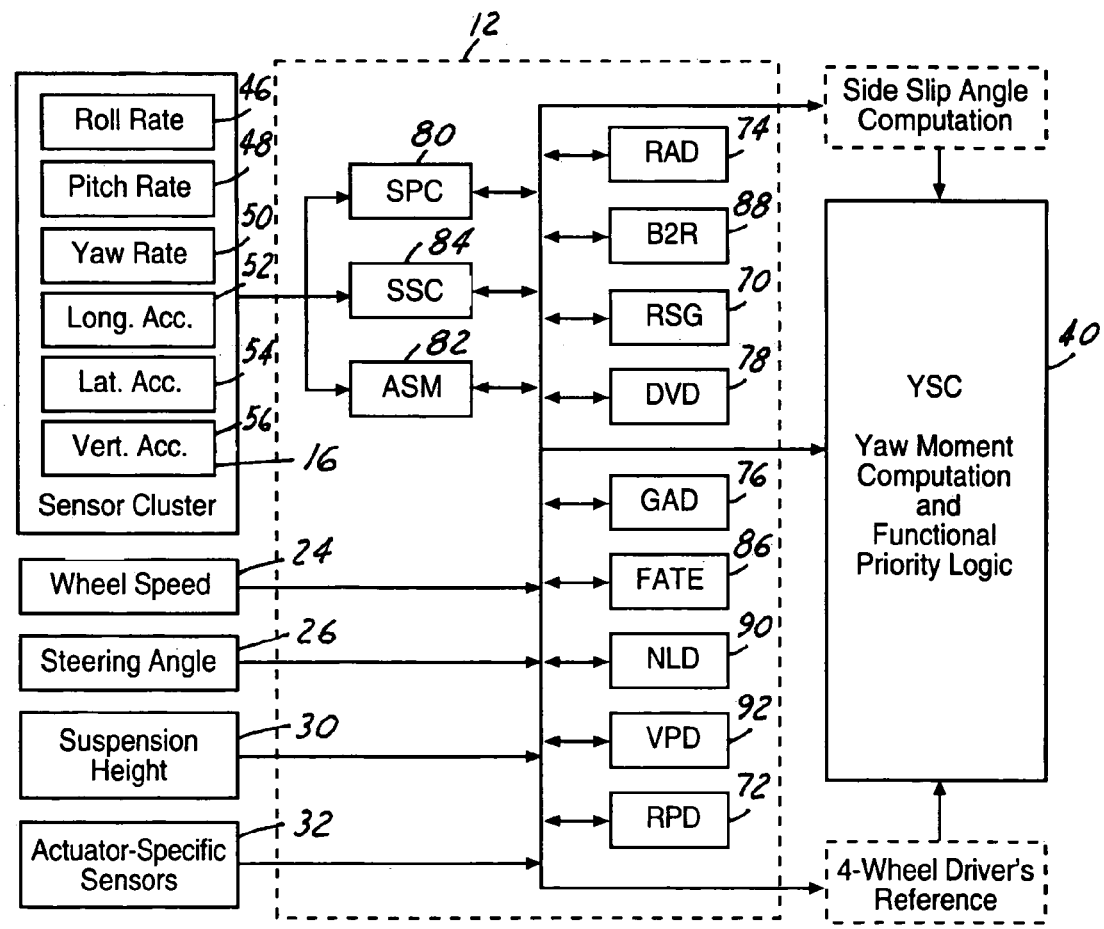
FIG. 3 is a diagrammatic view of a vehicle system in accordance with another embodiment of the present invention.
Figure 2:
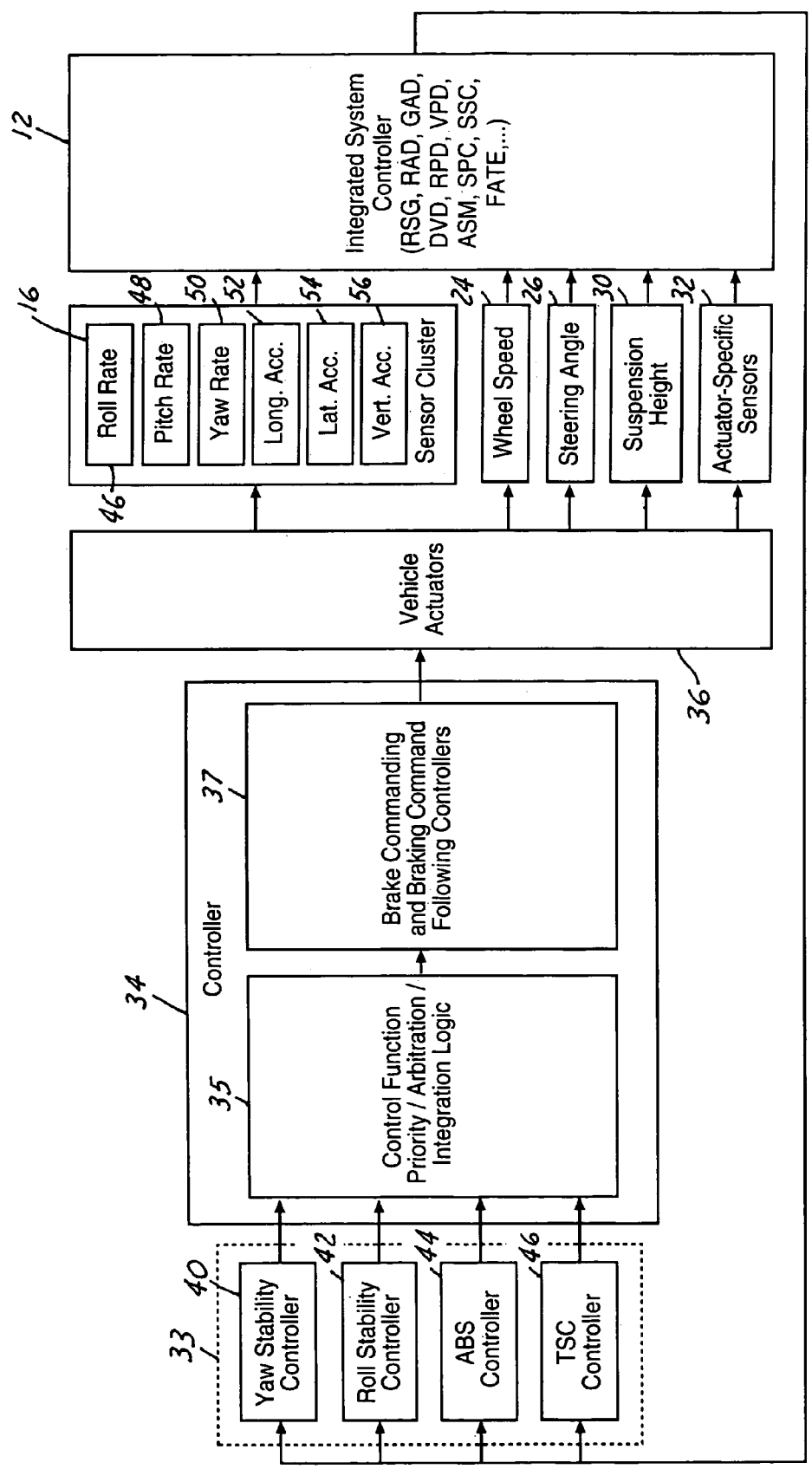
FIG. 2 is a diagrammatic view of a vehicle system in accordance with FIG. 1.

Referring to FIGS. 1, 2, and 3 a vehicle control system 10 for an automotive vehicle 14 having a controller (here embodied as the integrated system controller 12) is illustrated. The system 10 also includes a sensor cluster 16 or inertial measurement unit (IMU) sensor cluster, wheel speed sensors 24, steering angle sensors 26, suspension height sensors 30, local actuator sensors 32 used by the subsystem controls, a dynamic system controller 33, a braking controller 34 and various alternate vehicle actuators 36, all of which will be discussed in detail later.

The system components are connected in the following possible arrangement: the integrated system controller 12 is electrically coupled to the sensor cluster 16 and various other vehicle sensors 24, 26, 30, 32. Signals from the integrated system controller 12 are received in a dynamic system controller 33, including the yaw stability controller 40, the roll stability controller 42, the antilock braking system (ABS) controller 44, and the traction control system (TCS) controller 46. Signals from the dynamic system controller 33 are received in a braking controller 34. Braking controller signals are received in vehicle and vehicle actuators 36, such as brake calipers and braking devices.

The integrated controller 12 includes sensing algorithms including but not limited to reference attitude and reference directional velocity determinations, global/relative attitude determination, directional velocity determination, sensor plausibility check, sensor signal conditioning, sensor error compensation, road profile, surface condition determination, and abnormal state monitoring.

The integrated controller 12 includes various control units controlling the aforementioned sensing algorithms. These units may include: a reference signal unit 70 (reference signal generator (RSG)), which includes an attitude reference computation and a velocity reference computation, a road profile unit 72 (road profile determination unit (RPD)), an attitude unit or relative attitude determination unit 74 (RAD), a global attitude unit 76 (global attitude determination unit (GAD) and a directional unit 78 (directional velocity determination unit (DVD)), a sensor plausibility unit 80 (sensor plausibility check unit (SPC)), an abnormal state unit 82 (abnormal state monitoring unit (ASM)), a sensor signal compensating unit 84 (SSC), an estimation unit 86 (force and torque estimation unit (FATE)), a car body to fixed reference frame unit 88 (body to reference unit (B2R)), a normal load unit 90 (normal loading determination unit (NLD)), and a vehicle parameter unit 92 (vehicle parameter determination unit (VPD)). Signals generated from any one of the aforementioned units are referred to prediction of vehicle operation states signals.

The integrated controller 12 receives a roll rate signal, a pitch rate signal, a yaw rate signal, a longitudinal acceleration signal, a lateral acceleration signal, and a vertical acceleration signal from the sensor cluster 16 and other signals from other vehicle sensors, and generates a vehicle reference velocity signal and various other control signals in response thereto, such as an estimate of vehicle operation states signal and a prediction of vehicle operation states signal.

The system 10 includes the sensor cluster 16, wheel speed sensors 24, steering angle sensors 26, suspension height sensors 30, and local sensors 32 used by the subsystem controls. Such sensor sets cover almost all existing vehicle control functions. As an illustrative example, the yaw stability control 40 uses only a portion of the sensors from the system sensor set, such as those generating 4-wheel drive reference signals from the reference signal unit 70 and side slip angle computations from the directional unit 78.

The sensor cluster 16, within the housing 44, includes a roll rate sensor 46 generating a roll rate signal, a pitch rate sensor 48, generating a pitch rate signal, a yaw rate sensor 50 generating a yaw rate signal, a longitudinal acceleration sensor 52 generating a longitudinal acceleration signal, a lateral acceleration sensor 54 generating a lateral acceleration signal, and a vertical acceleration sensor 56 generating a vertical acceleration sensor 56 generating a vertical acceleration signal.

The sensor cluster 16 is mounted on the center of gravity of the vehicle 14 (or mounted on any location of the vehicle 14 that can be transformed into the center of gravity of the vehicle 14), the wheel speed sensors 24 are mounted at each corner of the vehicle 14, and the rest of the sensors are mounted on their respective locations in the vehicle 14.

As was previously mentioned, the sensor cluster 16 includes three gyros 46, 48, 50 and three linear accelerometers 52, 54, 56. The three gyros 46, 48, 50 and three linear accelerometers 52, 54, 56 in the sensor cluster 16 are calibrated and mounted along the vehicle body-fixed directions, x, y and z.

As those skilled in the art will recognize, the frame from x, y and z is referred to as a body frame 61, whose origin is located at the center of gravity of the car body 63, with the x pointing forward, y pointing off the driving side 65 (to the left), and the z pointing upward. The angular rate outputs of the sensor cluster measure the car body 63 angular rates along the body-fixed axes and are denoted about their respective axes as $\omega_x$ for the roll rate, $\omega_y$ for the pitch rate and $\omega_z$ for the yaw rate. The acceleration outputs from the sensor cluster 16 are measures of the car body directional accelerations along the body-fixed axes and are denoted about their respective axes as $a_x$ for longitudinal acceleration, $a_y$ for lateral acceleration and $a_z$ for vertical acceleration.

The wheel speed sensors 24 are mounted at wheel locations and are denoted as $w_{lf}$, $w_{rf}$, $w_{lr}$, $w_{rr}$ for left-front 58, right-front 60, left-rear 62 and right-rear wheels 64 respectively.

The roll, pitch and yaw attitude angles of a vehicle 14 are related to the roll angular rate, pitch angular rate and yaw angular rate sensor signals through coupled interactions, rather than simple integrations and differentiations. Simple integrations work when the different motions of the vehicle 14 are decoupled. In general, complicated relationships exist among the vehicle attitudes and the angular rates. If the vehicle roll, pitch and yaw attitude angles are denoted as $\theta_x$, $\theta_y$ and $\theta_z$, then this complicated relationship can be expressed in the following functional relationship due to the so-called Euler transformation.

$$\dot{\theta}_x = \omega_x + [\omega_y \sin(\theta_x) + \omega_{z3} \cos(\theta_x)]\tan(\theta_y)$$

$$\dot{\theta}_y = \omega_y \cos(\theta_x) - \omega_z \sin(\theta_x) \quad (1)$$

$$\dot{\theta}_z = [\omega_y \sin(\theta_x) + \omega_{z3} \cos(\theta_x)]sec(\theta_y)$$

The relationship depicted in the above equation reveals complicated nonlinear functions. The above equation indicates a simple integration of the roll rate, i.e., $$\theta_x(t) = \int_0^t \omega_x(\tau) d\tau$$

will fail to provide an accurate estimation of the vehicle roll attitude used in vehicle dynamics control (for example in roll stability control). The above simple integration only provides accurate information about the roll attitude angle when (a) both the pitch and yaw rate of the vehicle are negligible, which means the vehicle is dominated by roll motion; (b) the roll attitude angle and yaw rate are negligible, the pitch attitude is limited; and, (c) the pitch attitude angle is negligible with non-extreme pitch and yaw rates. All those three driving conditions are hardly true when the vehicle is in an excessive maneuver which triggers the vehicle dynamics controls. The simple integration of the pitch rate is:

$$\theta_y(t) = \int_0^t \omega_y(\tau) d\tau$$

which fails to provide an accurate estimation of the vehicle pitch attitude used in vehicle dynamics controls (for example used in roll stability control and hill decent control). This simple integration merely leads to accurate prediction of the pitch attitude if the roll attitude angle is negligible and the yaw rate is not extremely large.

The yaw attitude angle is obtained from simple integration of the yaw rate sensor if the pitch and roll attitude are negligible with non-extreme pitch rate.

The following is simultaneously true:

$$\dot{\theta}_x \approx \omega_x, \dot{\theta}_y \approx \omega_y,$$

only if $\theta_x \approx 0$ and $\theta_y \approx 0$, or $\theta_x \approx 0$ and $\omega_z \approx 0$. That is, either the vehicle has small roll and pitch attitude angles, or the vehicle has a small roll attitude angle plus a small yaw rate. This contradicts with the purpose of using them in rollover and pitch-over detection, since both roll and pitch attitude angles are large, and vehicles usually experience combined roll, pitch and yaw motions.

A direct integration for (1) can be formulated as the following:

$$\theta_x(k+1) = \theta_x(k) + \{\omega_x(k+1) + [\omega_y(k+1)\sin(\theta_x(k)) + \omega_z(k+1)\cos(\theta_x(k))]\tan(\theta_y(k))\}\Delta T$$

$$\theta_y(k+1) = \theta_y(k) + \{\omega_y(k+1)\cos(\theta_x(k)) - \omega_z(k+1)\sin(\theta_x(k))\}\Delta T$$

$$\theta_z(k+1) = \theta_z(k) + \{[\omega_y(k+1)\sin(\theta_x(k)) + \omega_z(k+1)\cos(\theta_x(k))]sec(\theta_y(k))\}\Delta T \quad (2)$$

where $\Delta T$ is the sampling time of the controller. This integration tends to drift due to sensor error and due to numerical computation error. Periodically, the attitudes are required to be initialized to some reference signals, for example $$\theta_x(N) = \theta_{x\text{-}REF}(N)$$

$$\theta_y(N) = \theta_{y\text{-}REF}(N)$$

$$\theta_y(N) = \theta_{y\text{-}REF}(N)$$

for N to be chosen as the multiple of the periods or feeding the attitude error between the calculated attitudes and the reference signals:

$$\theta_x(k) - \theta_{x\text{-}REF}(k)$$

$$\theta_y(k) - \theta_{y\text{-}REF}(k)$$

$$\theta_y(k) - \theta_{y\text{-}REF}(k)$$

into a Kalman filter or an extended Kalman filter such that calculated attitudes converge to true attitudes. In aerospace industry, such reference signals are usually obtained through the signals from a GPS system.

In the present invention, reference attitudes are obtained through a road constraint. The road constraint considered here is based on the inference that, on average, the vehicle is driven on the road (which could be 3-dimensional), and the vehicle contacts the road and does not have a large take-off velocity. This road constraint does not exclude the potential vehicle take-off velocity due to road unevenness (for example, bumps) causing vehicle heave vibrations. The average vehicle heave velocity, however, should be around zero; or the low frequency portion of the vehicle heave velocity should be zero. This unique operating condition for automotive vehicles helps eliminate the need for external sources like GPS to calculate reference attitudes.

Due to the road constraint, a reference attitude can be calculated based on the aforementioned three accelerometer outputs and the three angular rate outputs from the sensor cluster, the vehicle reference velocity calculated from the wheel speed signals, the steering angle, together with the vehicle dynamics model. Such computations are performed in a reference signal generator unit 70, which generates the reference signal therefrom. The vehicle reference velocities include longitudinal reference velocity, lateral reference velocity or a side-slip angle.

The reference velocities and reference attitude angles are denoted as: $v_{x\text{-}REF}$, $v_{y\text{-}REF}$, $v_{z\text{-}REF}$, $\theta_{x\text{-}REF}$, $\theta_{y\text{-}REF}$ and $\theta_{z\text{-}REF}$. $v_{x\text{-}REF}$ is calculated from the wheel speed sensor signals, the steering angle, the yaw angular rate and other calculated variables. The reference velocities and reference attitudes are normally determined for antilock braking systems, traction control systems, yaw stability control, and roll stability control. The road constraint assumption implies that:

$$v_{z\text{-}REF} = 0$$

around low frequencies. Hence only three reference signals $v_{y\text{-}REF}$, $\theta_{x\text{-}REF}$, $\theta_{y\text{-}REF}$ need to be calculated. Therefore, the reference signal unit 70 contains a lateral reference velocity computation unit for computing reference lateral velocity $v_{x\text{-}REF}$, a roll attitude reference computation unit for computing the reference roll attitude $\theta_{x\text{-}REF}$, a pitch attitude reference computation unit for computing the reference pitch attitude $\theta_{x\text{-}REF}$.

The reference signals generated from the reference signal unit 70 are generally accurate at low frequencies because the low frequency portion of the heave velocity of a vehicle body is almost zero. Hence the lower-pass filtered $v_{y\text{-}REF}$, $\theta_{x\text{-}REF}$, $\theta_{y\text{-}REF}$ matches the low frequency portion of the actual vehicle states of lateral velocity $v_y$, roll attitude $\theta_x$ and pitch attitude $\theta_y$. That is:

$$LPF_1[v_{y\text{-}REF}] = LPF_1[v_y]$$

$$LPF_2[\theta_{x\text{-}REF}] = LPF_2[\theta_x] \quad (3)$$

$$LPF_3[\theta_{y\text{-}REF}] = LPF_3[\theta_y]$$

The low-pass-filters $LPF_1$, $LPF_2$, $LPF_3$ have various cut-off frequencies $\omega_{c1}$, $\omega_{c2}$, $\omega_{c3}$ which are optimized and tuned based on the real data.

In order to solve the nonlinear differential equations in real-time for the attitude angles $\theta_x$ and $\theta_y$, the simple numerical integration, as shown above, is not applicable because the sensor errors and numerical errors both tend to cause integration drift off, i.e., the integration errors increase over time. Instead of using GPS attitude as in INS systems, the reference signals from the reference signal generator (RSG) are used. Important to note is that only the low frequency portion of the reference signals $v_{y\text{-}REF}$, $\theta_{x\text{-}REF}$, $\theta_{y\text{-}REF}$ are close to the true vehicle variables.

In order to reduce or eliminate pure-integration-induced drift, filters or anti-integration-drift filters (AID) are used for solving the nonlinear differential equations shown above. Such filters can be expressed as in the following for $2^{nd}$ order case $$T_{AID_i}(z^{-1}) = \frac{d_{i1}(1 - z^{-2})}{1 - c_{i1}z^{-1} + c_{i2}z^{-2}}$$

where i=1, 2, 3, $d_{i1}$, $c_{i1}$, $c_{i2}$ are the filter coefficients.

$\hat{\theta}_x$ is the calculated vehicle attitude for roll attitude angle, $\hat{\theta}_y$ for pitch attitude angle, therefore the total roll and pitch velocities using the past estimated value of the vehicle attitudes can be computed as in the following:

$$\Theta_{xvt}(k+1) = \omega_x(k+1) + [\omega_y(k+1)\sin(\theta_x(k)) + \omega_z(k+1)\cos(\theta_x(k))]\tan(\theta_y(k))$$

$$\Theta_{yvt}(k+1) = \omega_y(k+1)\cos(\theta_x(k)) - \omega_z(k+1)\sin(\theta_x(k))$$

Then the digital implementation of the filter can be expressed as the following for roll attitude:

$$\hat{\theta}_{x\text{-}dyn}(k+1) = c_{12}\hat{\theta}_{x\text{-}dyn}(k) - c_{22}\hat{\theta}_{x\text{-}dyn}(k-1) + d_{12}[\Theta_{xvt}(k+1) - \Theta_{xvt}(k-1)]$$

$$\hat{\theta}_{x\text{-}dyn}(0) = \theta_{y0}$$

and for pitch attitude:

$$\hat{\theta}_{y\text{-}dyn}(k+1) = c_{13}\hat{\theta}_{y\text{-}dyn}(k) - c_{23}\hat{\theta}_{y\text{-}dyn}(k-1) + d_{12}[\Theta_{yvt}(k+1) - \Theta_{yvt}(k-1)]$$

$$\hat{\theta}_{y\text{-}dyn}(0) = \theta_{y0}$$

The previous two equations perform integrations but remove the potentially right low frequency portion. Therefore, the useful low frequency portion should be recovered. Such recovery is possible due to the road constraint assumption as was previously mentioned. If the low-pass-filters are chosen as the following for i=1, 2, 3;

$$LPF_i(z^{-1}) = \frac{e_{i1} + e_{i2}z^{-1} - e_{i3}z^{-2}}{1 - c_{i1}z^{-1} + c_{i2}z^{-2}}$$

where the filter coefficients satisfying the following constraints:

$e_{i1}=e_{i2}+e_{i3}$ $2e_{i2}=1-c_{i1}+c_{i2}$

Then the low frequency portion of the reference variables are calculated from the following digital schemes:

$\hat{\theta}_{x\text{-}lpf}(k+1)=c_{12}\hat{\theta}_{x\text{-}lpf}(k)-c_{22}$
$\hat{\theta}_{x\text{-}lpf}(k-1)+e_{12}\theta_{x\text{-}REF}(k+1)+e_{22}\theta_{x\text{-}REF}(k)-e_{23}\theta_{x\text{-}REF}(k-1)$ $\hat{\theta}_{x\text{-}lpf}(0)=\theta_{x\text{-}REF0}$ for low frequency roll attitude:

$\hat{\theta}_{y\text{-}lpf}(k+1)=c_{13}\hat{\theta}_{y\text{-}lpf}(k)-c_{23}$
$\hat{\theta}_{y\text{-}lpf}(k-1)+e_{13}\theta_{y\text{-}REF}(k+1)+e_{23}\theta_{y\text{-}REF}(k)-e_{33}\theta_{y\text{-}REF}(k-1)$ $\hat{\theta}_{y\text{-}lpf}(0)=\theta_{y\text{-}REF0}$ Therefore the roll and pitch attitude can be determined as in the following:

$\hat{\theta}_x(k)=\hat{\theta}_{x\text{-}lpf}(k)+\hat{\theta}_{x\text{-}dyn}(k)$ $\hat{\theta}_y(k)=\hat{\theta}_{y\text{-}lpf}(k)+\hat{\theta}_{y\text{-}dyn}(k)$ The above computations are performed at the attitude determination unit or global attitude unit 76, which generates the global attitude signal therefrom.

Determining vehicle lateral velocity can be conducted based on reference lateral velocity $v_{y\text{-}REF}$, the lateral acceleration, the yaw rate, the steering angle, the past value of the calculated roll and pitch attitudes. The similar two-filter structure used previously herein is also required. This is performed at the directional unit or the directional velocity unit 78, which generates the directional velocity signal therefrom.

The relative attitudes of the vehicle with respect to the average road surface can be:

$\hat{\theta}_{x\text{-}relative}(k+1)=e_0\hat{\theta}_{x\text{-}relative}(k)+e_1[\Theta_x(k+1)+\Theta_x(k)]$ $\hat{\theta}_{y\text{-}relative}(k+1)=f_0\hat{\theta}_{y\text{-}relative}(k)+f_1[\Theta_y(k+1)+\Theta_y(k)]$ where $\Theta_x(k)=a\dot{\omega}_x(k)+ba_y(k)$ $\Theta_y(k)=g\dot{\omega}_y(k)+ha_x(k)$ These computations are also performed in the attitude unit 74, which generates a relative attitude signal therefrom.

Since one of the angular rates can be estimated from the rest of the sensor signals in the sensor cluster 16, the calculated variables, and the reference variables; the sensor plausibility can be checked within the controller. For example the pitch rate sensor can be estimated as:

$\hat{\omega}_y=\hat{\theta}_y sec(\hat{\theta}_x)+\omega_z \tan(\hat{\theta}_x)$ Therefore by comparing the pitch rate sensor output with the above estimated pitch rate, pitch rate sensor plausibility can be conducted. The plausibility for roll rate sensor and yaw rate sensor can be similarly performed. Those are performed within the sensor check unit or sensor plausibility unit 80, which generates a sensor plausibility signal therefrom.

Because of the relationships between the sensor signals, the sensor mounting errors can also be corrected within the controller 12. For example, the roll rate sensor misalignment can be calculated based on the sensor cluster signals other than roll rate sensor signal and the vehicle longitudinal reference velocity:

$$\Delta\theta_x = \frac{\omega_z v_x}{g - a_z - \omega_y v_x}$$

Similar misalignment or mounting errors of the other sensors are also performed. The sensor information is then used to conduct real-time calibration for sensor signals. For example, the rolling radius calibration for wheel speed sensors can be performed based on the available sensor signals and the calculated signals. Those computations are conducted at the sensor compensation unit or sensor signal unit 84, which generates a sensor compensation signal therefrom.

The sensors also provide information for estimating and predicting the road profile, the road surface and the road curvatures. Such computations are conducted in the road profile unit 72, which generates a road profile signal including but not limited to surface friction level, surface unevenness (roughness), road inclination and bank angle, therefrom.

The abnormal conditions of the vehicle also detected and monitored in the system. These abnormal conditions include tire under-inflation, tire imbalance, actuator failure, wheel lifting, etc. Such functions are performed in an abnormal state unit or abnormal state monitoring unit 82, which generates the abnormal state signal therefrom.

The forces and torques applied to the wheels play important roles in many vehicle control functions. The system 10 also conducts estimation of and prediction of those loadings in an estimation unit or force and torque unit or force and torque estimation unit 86 (FATE), which generates the force and torque signal therefrom.

The reference attitude signal obtained based on all the sensor signals and the road constraint assumption is calculated and then used to correct the attitude computation errors.

Besides the sensor cluster 16, the system 10 also includes wheel speed sensors 24, a wheel steering angle sensor 26, suspension height sensors, and any actuator specific sensors 32 (for example, the brake pressure sensors and all the other sensors which are used for subsystem controls. Hence the system provides the vehicle operation states, such as: vehicle attitudes with respect to the average road surface, vehicle directional velocity, road profile and surface conditions, traction forces, and tire forces.

Another aspect of the system 10 is the ability to conduct sensor plausibility checks, sensor error compensation, and abnormal vehicle state monitoring and detection because all the sensor signals are available to the system 10. Many of the sensor signals have cross influences over other sensor signals, and there are interconnecting relationship among all the sensor signals.

The dynamic system controller 33 receives the vehicle reference velocity signal and generates a dynamic control signal in response thereto. The dynamic system controller may include a yaw stability controller 40, a roll stability controller 42, an ABS controller 44, or a TCS controller 46, or any combination thereof either separate or together in a single dynamic system unit.

The braking system controller 34 or safety device controller/vehicle safety system receives the dynamic control signal and generates a braking signal in response thereto. The braking system controller 34 includes control function priority/arbitration/integration logic 35 and brake communicating and brake command controllers 37.

The braking system controller 34 receives at least one of a plurality of signals including: the road profile signal, the vehicle attitude signal, the global position signal, the vehicle direction signal, the sensor plausibility signal, the abnormal state signal, the mounting sensor error correction signal, and the force and torque signal. In one embodiment of the present invention, the braking system controller 34 checks the vehicle reference velocity signal with the at least one of the plurality of signals. In alternate embodiments, the braking system controller 34 predicts future vehicle states from at least one of the aforementioned signals and activates safety devices in response thereto.

The various alternate known actuators 36 include active steering systems, active braking systems, active transmission systems, drive-train controls, power-train controls, throttle controls, controllable suspensions, controllable anti-roll-bar, etc. The actuators 36 are activated in response to the signals generated from the integrated system controller 12.

Figure 4:
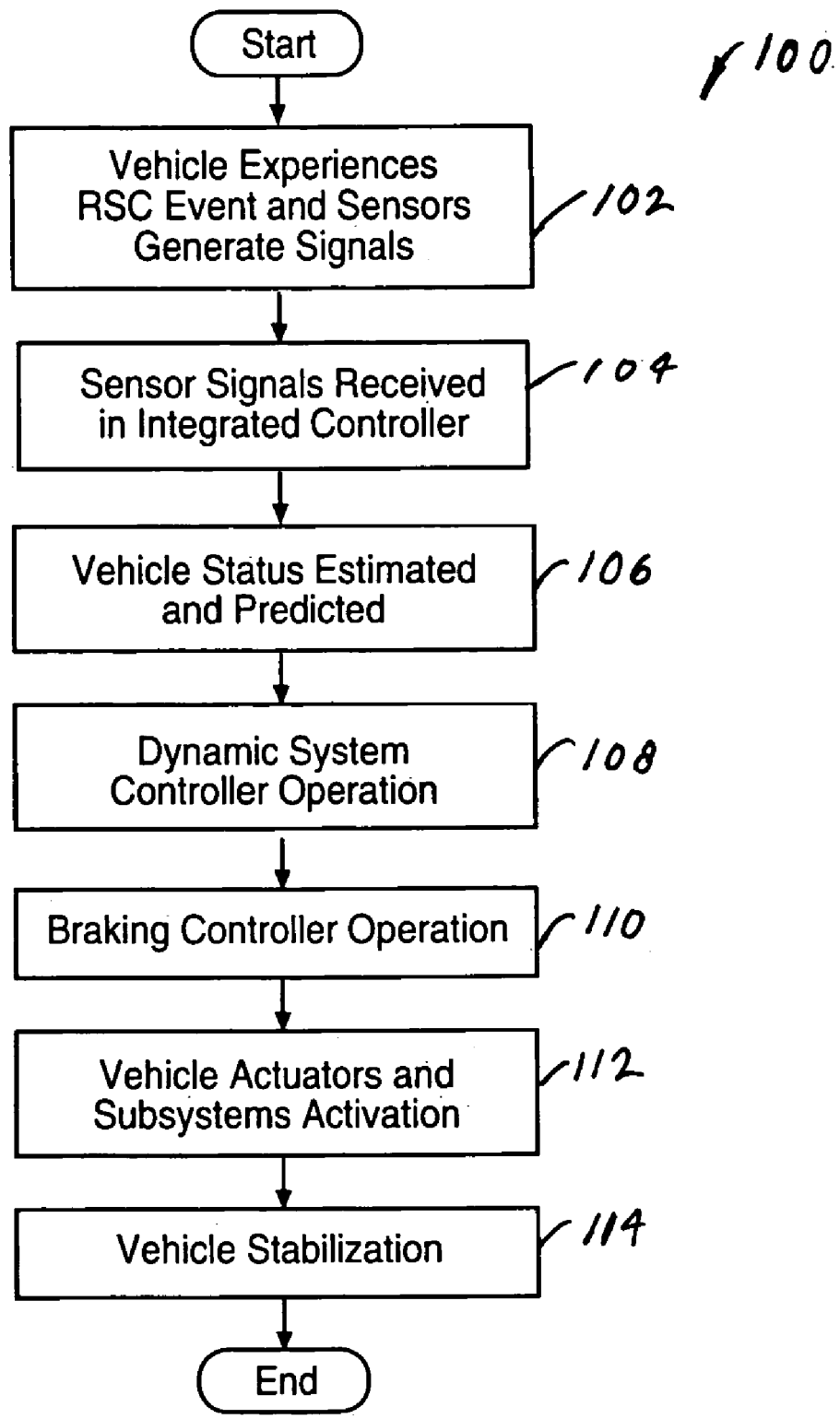
FIG. 4 is a logic flow diagram of a method for controlling a vehicle dynamic system in accordance with another embodiment of the present invention.

Referring to FIG. 4, a logic flow diagram 100 of a method for controlling a vehicle dynamic system, in accordance with another embodiment of the present invention, is illustrated. Logic starts in operation block 102, where the vehicle 14 experiences an RSC event. The sensors within the sensor cluster 16 respond to RSC event data by generating sensor signals, as was previously discussed. In operation block 104, the sensor cluster signals and various other vehicle sensor signals are received in the integrated system controller 12.

In operation block 106, the integrated system controller 12 estimates current vehicle states and predicts future vehicle states in response to the RSC generated sensor signals.

In operation block 108, a dynamic system controller 33 receives the integrated system controller signals and generates therefrom stability control signals.

In operation block 110, the braking controller 34 receives the dynamic system controller signals and generates therefrom braking signals. In response thereto, in operation block 112, vehicle actuators 36 and vehicle systems are activated to respond to or compensate for the RSC event. In operation block 114, the vehicle actuators 36 and systems compensate for the RSC event and attempt to stabilize the vehicle 14.

In operation, a method for controlling a safety device for a vehicle 14 includes generating a roll rate signal, generating a pitch rate signal, generating a yaw rate signal, generating a longitudinal acceleration signal, generating a lateral acceleration signal, generating a vertical acceleration signal, generating a vehicle reference velocity signal in response to the roll rate signal, the pitch rate signal, the yaw rate signal, the longitudinal acceleration signal, the lateral acceleration signal, and the vertical acceleration signal. A dynamic control signal is generated in response to the vehicle reference velocity signal, and a vehicle safety device is controlled in response to the safety device control signal.

The method also includes generating an attitude reference computation, generating a road profile signal, generating a vehicle attitude signal, generating a global position signal, generating a vehicle direction signal, generating a sensor plausibility signal, generating an abnormal state signal including information regarding abnormal vehicle conditions, generating a mounting sensor error correction signal, generating a force and torque signal in response to forces and torques applied to the vehicle, generating a body fixed frame to roll frame signal, generating a normal load signal, generating a vehicle parameter signal, and generating the safety device control signal in response to a combination of the attitude reference computation, the road profile signal, the vehicle attitude signal, the global position signal, the vehicle direction signal, the sensor plausibility signal, the abnormal state signal the mounting sensor error correction signal, and the force and torque signal.

While particular embodiments of the invention have been shown and described, numerous variations and alternate embodiments will occur to those skilled in the art. Accordingly, it is intended that the invention be limited only in terms of the appended claims.

What is claimed is:

1. A vehicle control system comprising:
   a housing;
   a steering wheel angle sensor generating a steering angle signal;
   a sensor cluster within said housing generating a plurality of signals including a roll rate signal, a pitch rate signal, a yaw rate signal, a longitudinal acceleration signal and a lateral acceleration signal;
   an integrated controller receiving said plurality of signals and generating a low pass filtered lateral velocity signal, a low pass filtered roll angle signal and a low pass filtered pitch angle signal, said controller generating a dynamic pitch angle signal in response to the yaw rate signal and the pitch rate signal, said controller generating a dynamic roll angle signal in response to the roll rate signal, the yaw rate signal and the pitch rate signal, said integrated controller generating a vehicle pitch angle signal in response to the low pass filtered pitch angle signal and the dynamic pitch angle signal and a vehicle roll angle signal in response to the low pass filtered roll angle signal and the dynamic roll angle signal, said controller generating a vehicle lateral reference velocity signal in response to the low pass filtered lateral velocity signal, the vehicle roll attitude signal and the vehicle pitch attitude signal, the yaw rate signal and the steering angle signal;
   a dynamic system controller receiving said lateral vehicle reference velocity signal and generating a dynamic control signal in response thereto; and
   a braking system controller receiving said dynamic control signal and further generating a braking signal in response thereto.

2. A system as in claim 1, wherein said sensor cluster comprises at least three angular rate sensors and at least three linear acceleration sensors.

3. A system as in claim 1, wherein said integrated controller further comprises a reference signal unit generating an attitude reference computation,
   a road profile unit generating a road profile signal,
   an attitude unit generating a vehicle attitude signal,
   a global attitude unit generating a global position signal,
   a directional unit generating a vehicle direction signal,
   a directional velocity unit generating a vehicle direction velocity signal,
   a sensor plausibility unit generating a sensor plausibility signal,
   an abnormal state unit generating an abnormal state signal including information regarding abnormal vehicle conditions, a sensor signal compensating unit generating a mounting sensor error correction signal, a force and torque estimation unit generating force and torque signal in response to forces and torques applied to the vehicle, a car body to fixed body unit generating a body fixed to rollover fixed foam signal, a normal loading unit generating a normal signal, and a vehicle parameter unit generating a vehicle parameter determination signal, wherein said integrated controller generates said vehicle reference velocity from at least one of said attitude reference computation, said road profile signal, said vehicle attitude signal, said global position signal, said vehicle direction signal, said sensor plausibility signal, said abnormal state signal, said mounting sensor error correction signal, or said force and torque signal.

4. A system as in claim 1, wherein said dynamic control system comprises at least one of power-train controls, brake controls, steering controls, transmission controls, and suspension controls, tire under inflation and unbalanced tires warning systems, on-line conditioning systems, and systems for calibration of errors in sensors due to mounting errors and vehicle loading variations.

5. A system as in claim 2, further comprising a yaw sensor which is the component of a sensor cluster.

6. A system as in claim 5, wherein said sensor cluster is generating vehicle dynamic signals including a roll rate signal, a yaw rate signal, a pitch rate signal, a longitudinal acceleration signal, a lateral acceleration signal, and a vertical acceleration signal.

7. A vehicle system comprising:

an IMU sensor cluster comprising at least three angular rate sensors and at least three linear acceleration sensors, said sensor cluster generating vehicle dynamic signals including a roll rate signal, a yaw rate signal, a pitch rate signal, a longitudinal acceleration signal, a lateral acceleration signal, and a vertical acceleration signal; and an integrated controller comprising a plurality of processing units receiving said vehicle dynamic signals and generating a plurality of vehicle control signals in response thereto, said plurality of processing units comprising a reference signal unit generating an attitude reference computation, a road profile unit generating a road profile signal, an attitude unit generating a vehicle attitude signal, a global attitude unit generating a global position signal, a directional unit generating a vehicle direction signal, a directional velocity unit generating a vehicle direction velocity signal, a sensor plausibility unit generating a sensor plausibility signal, an abnormal state unit generating an abnormal state signal including information regarding abnormal vehicle conditions, a sensor signal compensating unit generating a mounting sensor error correction signal, a force and torque estimation unit generating a force and torque signal in response to forces and torques applied to the vehicle, a car body to fixed body unit generating a body fixed to rollover fixed form signal, a normal loading unit generating a normal bad signal, and a vehicle parameter unit generating a vehicle parameter determination signal; and a vehicle safety system receiving said attitude reference computation, said road profile signal, said vehicle attitude signal, said global position signal, said vehicle direction signal, said sensor plausibility signal, said abnormal state signal, said mounting sensor error correction signal, and said force and torque signal, said integrated controller controlling said vehicle safety system in response to said attitude reference computation, said road profile signal, said vehicle attitude signal, said global position signal, said vehicle direction signal, said sensor plausibility signal, said abnormal state signal, said mounting sensor error correction signal, and said force and torque signal.

* * * * *